US 10,263,985 B2

(12) United States Patent
Lu et al.

(10) Patent No.: US 10,263,985 B2
(45) Date of Patent: Apr. 16, 2019

(54) WORK METHOD FOR SMART KEY DEVICE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Lrd., Beijing (CN)

(*) Notice: Subject to any disclaimer, the term of this patent is extended or adjusted under 35 U.S.C. 154(b) by 0 days.

(21) Appl. No.: 15/561,779

(22) PCT Filed: Apr. 29, 2016

(86) PCT No.: PCT/CN2016/080630
§ 371 (c)(1),
(2) Date: Sep. 26, 2017

(87) PCT Pub. No.: WO2016/202106
PCT Pub. Date: Dec. 22, 2016

(65) Prior Publication Data
US 2018/0091509 A1 Mar. 29, 2018

(30) Foreign Application Priority Data
Jun. 16, 2015 (CN) .......................... 2015 1 0332534

(51) Int. Cl.
H04L 29/00 (2006.01)
H04L 29/06 (2006.01)
G06Q 20/38 (2012.01)
H04L 9/06 (2006.01)
H04L 9/08 (2006.01)
(Continued)

(52) U.S. Cl.
CPC ........ H04L 63/0884 (2013.01); G06Q 20/38 (2013.01); H04L 9/0643 (2013.01); H04L 9/0861 (2013.01); H04L 9/3234 (2013.01); H04L 9/3247 (2013.01); H04L 9/3268 (2013.01); H04L 63/0823 (2013.01); G06Q 20/4014 (2013.01); H04L 2209/56 (2013.01)

(58) Field of Classification Search
CPC ............. H04L 63/0884; H04L 63/0823; H04L 9/3247; H04L 9/3234; H04L 9/0643; H04L 9/3268; H04L 9/0861
See application file for complete search history.

(56) References Cited

U.S. PATENT DOCUMENTS

2007/0106897 A1* 5/2007 Kulakowski ............ G06F 21/35
713/171
2010/0114780 A1* 5/2010 Tribe ................ G06Q 10/06375
705/50

(Continued)

Primary Examiner — Morshed Mehedi
(74) Attorney, Agent, or Firm — Hammer & Associates, P.C.

(57) ABSTRACT

A work method for a smart key device. A host machine acquires data from a trusted server via a browser and then transmits the data to a smart key device; the smart key device performs a signing operation when the data transmitted by the host machine is received and when a user confirmed by pressing a key and then returns a signing result to the host machine; and the host machine transmits data returned by the smart key device to the trusted server to verify the validity of the smart key device. This implements rapid authentication of user identity, thus allowing highly efficient, secure, and expedited online transactions.

13 Claims, 3 Drawing Sheets

(51) Int. Cl.
*H04L 9/32* (2006.01)
*G06Q 20/40* (2012.01)

(56) References Cited

U.S. PATENT DOCUMENTS

| | | | |
|---|---|---|---|
| 2012/0173873 A1* | 7/2012 | Bell | H04L 9/321 |
| | | | 713/156 |
| 2012/0323717 A1* | 12/2012 | Kirsch | G06Q 20/0855 |
| | | | 705/26.1 |
| 2014/0201395 A1* | 7/2014 | Lu | G06F 13/385 |
| | | | 710/10 |
| 2015/0256345 A1* | 9/2015 | Vaid | H04L 9/3268 |
| | | | 713/158 |

\* cited by examiner

WORK METHOD FOR SMART KEY DEVICE

FIELD OF THE INVENTION

The present invention relates to a working method of a smart key device, which belongs to the field of information security.

PRIOR ART

With development of Internet and E-commerce, the larger the amount of online transaction becomes, the more import the information security issue is, thus, the consumer pays more attention to the security issue of online transaction. In prior art, a consumer can make an online transaction via a dynamic password or a USB Key, but the dynamic password needs to be input during every transaction, the process is not convenient; after that, a consumer can make an online transaction by using quick payment; when quick payment is used, the consumer needs to input SMS (short message service) identifying code, thus it may cause irreparable loss to the user in the case that the cellphone of the user is lost. Thus, it is not safe to use the quick payment by inputting a SMS identifying code, and is not convenient for a consumer.

SUMMARY OF THE INVENTION

The object of the present invention is to provide a working method of a smart key device, which can realize quick authentication of a user identification so as to make an online transaction efficiently, safely and conveniently.

Thus, the present invention provides a working method of a smart key device, comprising:

Step S1, the smart key device powering on and initializing;

Step S2, setting, by the smart key device, a descriptor and returning the descriptor to an upper computer when an enumerating descriptor command sent from the upper computer is received by the smart key device;

Step S3, determining, by the smart key device, a type of a command when the command sent from the upper computer is received by the smart key device, executing Step S4 in the case that the command is a register-requesting command; executing Step S7 in the case that the command is an identify-requested command; executing a corresponding operation in the case that the command is other type of command, and returning to Step S3;

Step S4, determining, by the smart key device, whether user pressing-key information is received by the smart key device, if yes, executing Step S5; otherwise, prompting an error, and returning to Step S3;

Step S5, relating, by the smart key device, a generated user key pair with a correspondingly built key handle, and signing on data field of the register-requesting command according to a preset algorithm so as to obtain a first signature result and saving the first signature result; generating a certificate serial number, issuing a digital certificate corresponding to the certificate serial number for the user key pair by using a private key in a preset root key pair; in which, the data field of the register-requesting command includes a challenge parameter and a domicile application parameter;

Step S6, saving, by the smart key device, the user key pair and the key handle according to a preset format, and generating register-respond data according to the digital certificate and the first signature result and returning the register-respond data to the upper computer, and returning to Step S3;

Step S7, determining, by the smart key device, whether the user is legitimate according to the identify-requested command, if yes, executing Step S8; otherwise, prompting an error, and returning to Step S3;

Step S8, waiting, by the smart key device, for user pressing-key information, and determining whether the user pressing-key information is received, if yes, executing Step S9; otherwise, prompting an error, and returning to Step S3;

Step S9, obtaining, by the smart key device, a corresponding user key pair according to the key handle in the identify-requested command, and signing on the data field of the identify-requested command by using the private key in the user key pair according to the preset algorithm so as to obtain a second signature result; and Step S10, generating, by the smart key device, identify-respond data according to the second signature result and returning the identify-respond data to the upper computer, and returning to Step S3.

Preferably, the smart key device setting the descriptor and returning the descriptor to the upper computer includes:

Step S22-1, setting, by the smart key device, a content of a configuration descriptor as a HID device;

Step S22-2, setting, by the smart key device, a report descriptor;

Step S22-3, returning, by the smart key device, the configuration descriptor and the report descriptor to the upper computer.

Preferably, in Step S3, executing Step A1 in the case that the smart key device determines that the type of the command is a protocol command;

Step A1, detecting, by the smart key device, the fifth byte of the command, returning the received data to the upper computer in the case that data at the fifth byte is a first data, and returning to Step S3; returning data of seventeen valid bytes to the upper computer in the case that the data at the fifth byte is a second data, and returning to Step S3.

Preferably, in Step S3, executing Step B1 in the case that the smart key device determines that the command is an obtaining version number command;

Step B1, returning, by the smart key device, a preset character string to the upper computer, and returning to Step S3.

Preferably, between Step S3 and Step S4, the method further includes:

Step C1, generating, by the smart key device, the user key pair and the key handle, obtaining information of the key according to the user key pair and the domicile application parameter in the register-requesting command, looking up an unoccupied key index, executing Step S4 in the case that the unoccupied key index is found; executing Step C2 in the case that the unoccupied key index is not found;

Step C2, determining, by the smart key device, whether unoccupied space is large enough, if yes, generating a corresponding key index, and executing Step S4; otherwise, returning information that the unoccupied space is not large enough, and returning to Step S3;

Step S5 further includes: the smart key device relating the generated user key pair with the key index;

Step S6 further includes: the smart key device saving the user key pair, the key index and the domicile application parameter in the register-requesting command according to the preset format.

Preferably, when no user pressing-key information is received in Step S4, the method further includes: the smart key device determining whether waiting time reaches a preset duration, if yes, prompting an error, and returning to Step S3; otherwise, returning to Step S4.

Preferably, signing on the data field of the register-requesting command according to the preset algorithm includes:

performing, by the smart key device, hash algorithm on the data field of the register-requesting command according to the preset algorithm to obtain a first hash value, signing on the first hash value by using a private key in the user key pair so as to obtain the first signature result.

Preferably, when the smart key device determines that the user is legitimate in Step S7, the method further includes:

Step S71, determining, by the smart key device, whether a corresponding key handle is registered according to a key handle and a length of the key handle in the identify-requested command, if yes, executing Step S72; otherwise, prompting an error, and returning to Step S3;

Step S72, determining, by the smart key device, whether a domicile application parameter in the identify-requested command is same as the saved domicile application parameter, if yes, executing Step S8; otherwise, prompting an error, and returning to Step S3.

Preferably, Step S71 specifically includes:

Step S71-1, the smart key device determining whether a length of the key handle in the identify-requested command is same as the saved the length of the key handle, if yes, executing Step S71-2; otherwise, prompting an error, and returning Step S3;

Step S71-2, the smart key device determining whether a key handle in the identify-requested command is same as the saved key handle, if yes, executing Step S72; otherwise, prompting an error, and returning to Step S3.

Preferably, that the smart key device saving the user key pair and the key handle according to the preset format includes: the smart key device saving the user key pair, the key handle and the domicile application parameter in the register-requesting command according to the preset format; and between Step S3 and Step S4, the method further includes:

Step D1, the smart key device determining whether the current user is registered according to the domicile application parameter, if yes, prompting an error, and returning to Step S3; otherwise, executing Step D2;

Step D2, the smart key device generating the user key pair, and obtaining the information of the key according to the user key pair and the domicile application parameter in the register-requesting command, and executing Step S4.

Preferably, Step D1 includes:

the smart key device determining whether the domicile application parameter is saved, if yes, the current user is registered; otherwise, the current user is not registered.

Preferably, when the smart key device does not receive the user pressing-key information in Step S8, the method further includes: the smart key device determining whether the waiting time reaches the preset duration, if yes, prompting an error, and returning to Step S3; otherwise, returning to Step S8.

Preferably, that determining the type of the command in Step S3 specifically includes: the smart key device determining the type of the command according to a second byte of the data field of the command, the command is a register-requesting command in the case that data at the second byte of the data field is the first value; the command is an identify-requested command in the case that the data at the second byte of the data field is the second value.

According to the present invention, an identification of a user can be identified quickly so as to the user can make online transaction efficiently, safely and conveniently.

BRIEF DESCRIPTION OF ACCOMPANYING DRAWINGS

DETAILED DESCRIPTION OF THE INVENTION

The technical solutions in the Embodiments of the present invention are further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

Figure 1:
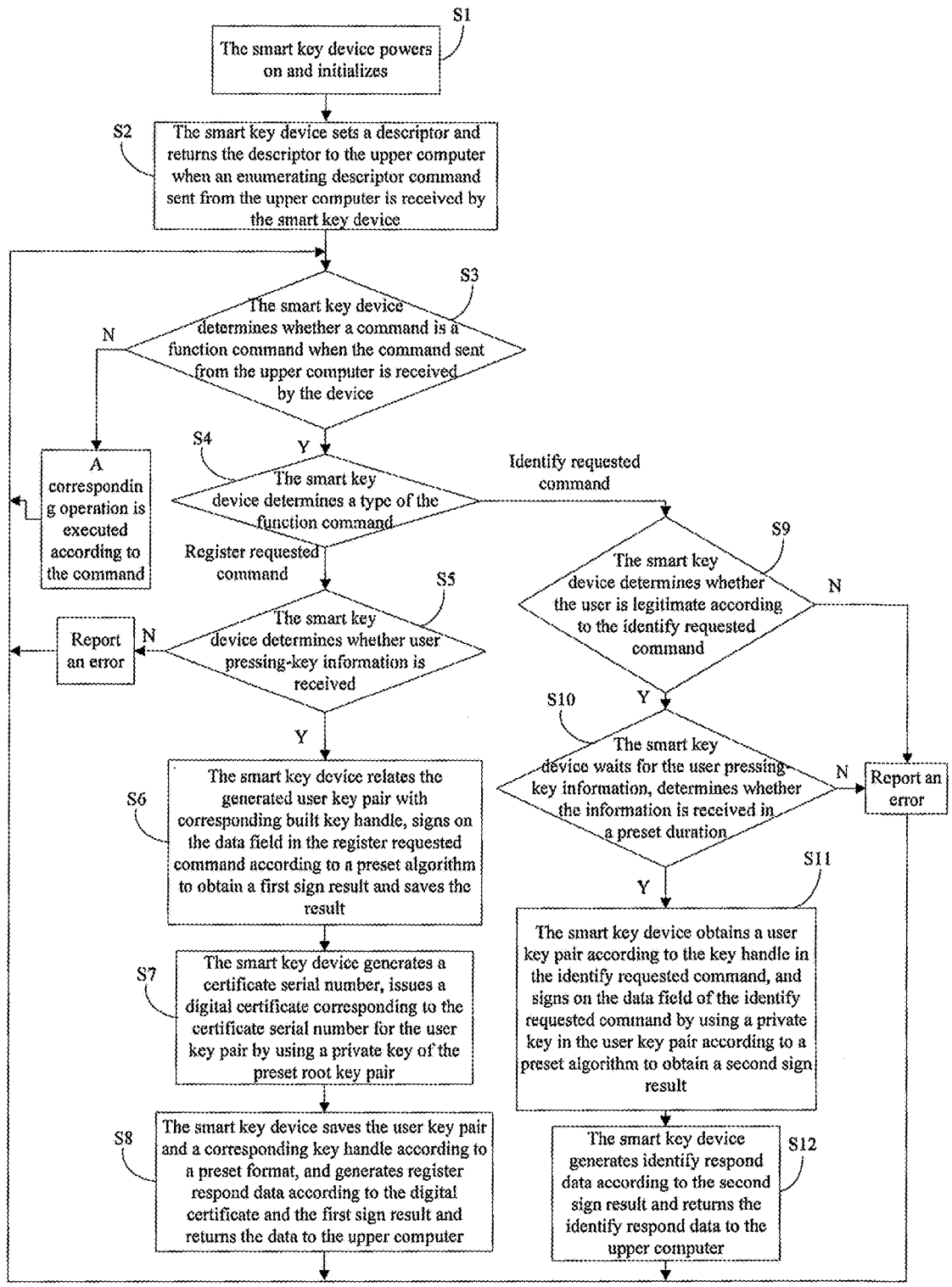
FIG. 1 shows a flow chart of a working method of a smart key device according to Embodiment 1 of the present invention.

It provides a working method of a smart key device according to Embodiment 1 of the present invention, as shown in FIG. 1, which includes:

Step S1, the smart key device is powered on and initialized;

Step S2, a descriptor is set and returned to an upper computer by the smart key device when an enumerating descriptor command sent from the upper computer is received by the smart key device;

Step S3, the smart key device determines whether a command is a functional command in the case that the command sent from the upper computer is received by the smart key device, if yes, Step S4 is executed; otherwise, a corresponding operation is executed according to the command, and Step S3 is returned to;

Step S4, the smart key device determines a type of the functional command, executing Step S5 in the case that the command is a register-requesting command; executing Step S9 in the case that the command is an identify-requested command;

Step S5, the smart key device determines whether user pressing-key information is received, if yes, executing Step S6; otherwise, prompting an error, and returning to Step S3;

Step S6, the smart key device relates a generated user key pair with a corresponding built key handle, and signs on data field of the register-requesting command according to a preset algorithm so as to obtain a first signature result and save the first signature result;

in Embodiment 1, the data field of the register-requesting command includes a challenge parameter and a domicile application parameter;

Step S7, the smart key device generates a certificate serial number, and issues a digital certificate corresponding to the certification serial number for the user key pair by using a private key in a preset root key pair;

Step S8, the smart key device saves the user key pair and a corresponding key handle according to a preset format, and generates register-respond data according to the digital certificate and the first signature result and returns the register-respond data to the upper computer, and returns to Step S3;

Step S9, the smart key device determines whether the user is legitimate according to the identify-requested command, if yes, Step 10 is executed; otherwise, an error is reported and Step S3 is returned to;

Step S10, the smart key device waits for user pressing-key information, and determines whether the user pressing-key information is received in a preset duration, if yes, Step S11 is executed; otherwise, an error is reported, and Step S3 is returned to;

Step S11, the smart key device obtains a corresponding user key pair according to the key handle in the identify-requested command, and signs on the data field of the identify-requested command by using a private key in the user key pair according to the preset algorithm so as to obtain a second signature result; and Step S12, the smart key device generates identify-respond data according to the second signature result and returns the identify-respond data to the upper computer, and returns to Step S3.

Embodiment 2

Figure 2:
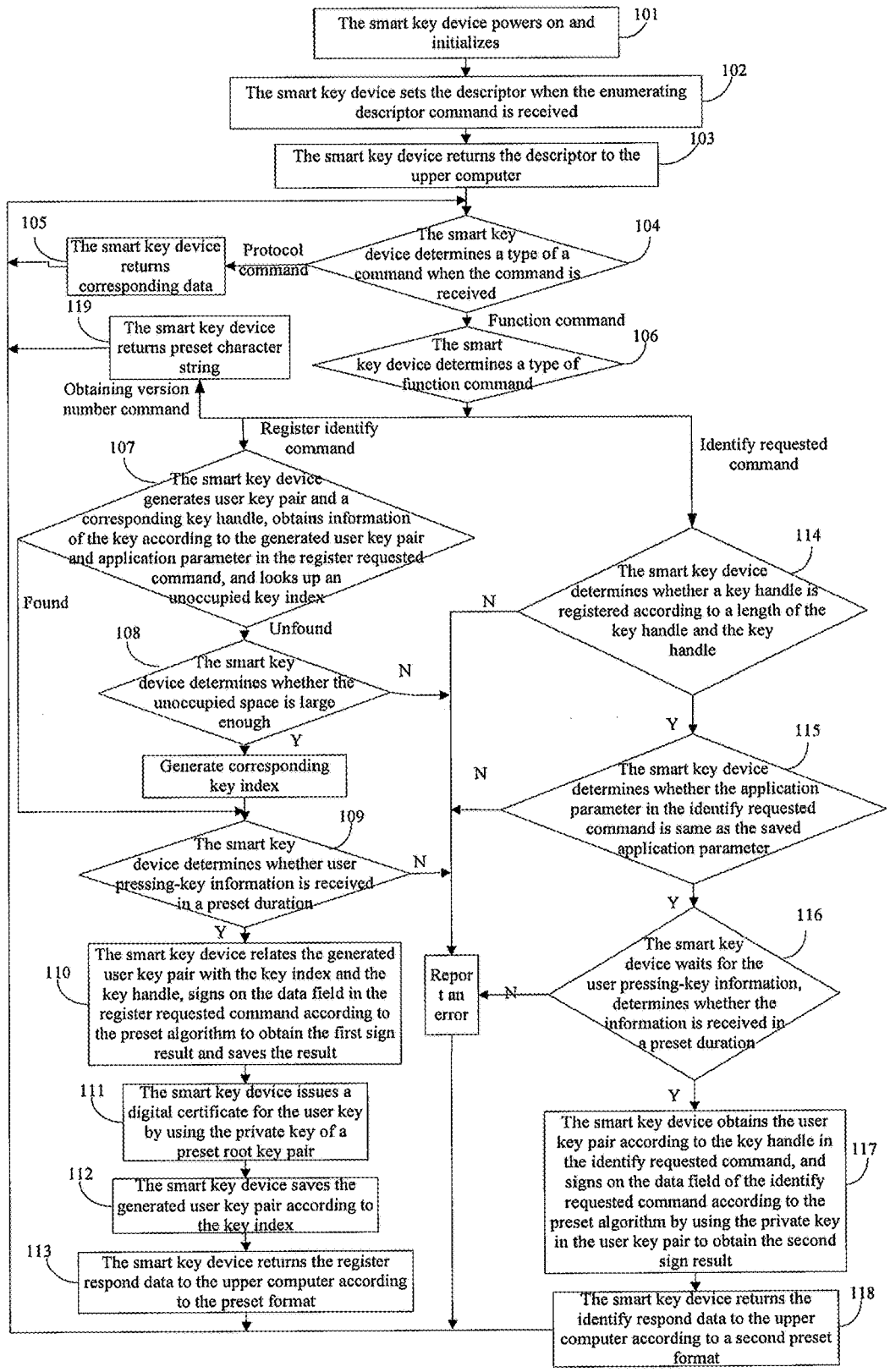
FIG. 2 shows a flow chart of a working method of a smart key device according to Embodiment 2 of the present invention.

It provides a working method of a smart key device according to Embodiment 2 of the present invention, in Embodiment 2, repeat registration is permitted and then identification is authenticated, as shown in FIG. 2, the method of Embodiment 2 includes:

Step 101, the smart key device is powered on and initialized;

Step 102, the smart key device sets a descriptor when an enumerating descriptor command sent from an upper computer is received by the smart key device;

specifically, in Embodiment 2, that the smart key device sets the descriptor comprises:

Step 102-1, a content of a configuration descriptor is set as a HID device;

Step 102-2, a report descriptor is set;

in Embodiment 2, a format of the report descriptor specifically is:

```
Usage Page, // usage page
Usage, // usage
Collection, // application collection
//Input report structure
Usage (X), Usage (Y), //usage X/Y
Logical Minimum (0), //logical minimum 0
Logical Maximum (255), //logical maximum 255
Feature Size (8), // report size is 8bits
Feature Count (64), // report count is 64bits
Input (Data, Variable, Relative), // input
//Output Report structure
Usage (X), Usage (Y), // usage X/Y
Logical Minimum (0), // logical minimum 0
Logical Maximum (255), // logical maximum 255
Feature Size (8), // feature size is 8bits
Feature Count (64), // feature count is 64 bits
Input (Data, Variable, Relative), // output
```

End Collection // application collection end that the report descriptor is set specifically includes: the global Usage Page is set as 0x d0 f1, the part Usage is set as 0x01, Usage in the Input Report structure is set as 0x02, Usage in the Output Report is set as 0x21; other parameters in the report descriptor are variables and can be set according to demand;

for instance, the report descriptor in Embodiment 2 is set as:

```
06 d0 f1    //  Usage Page
09  01      //  Usage
a1 01       //  Collection
// Input Report
09  20      //  Usage
15 00       //logical minimum(0)
26  ff      //logical maximum(255)
00 75 08 //  Feature Size (8 bits)
95 40       //  Feature Count(64 field,64 bytes)
81 02       //  Input
// Output Report
09 21       //  Usage
15 00       //logical minimum(0)
26 ff       //logical maximum(255)
00 75 08  //  Feature Size (8 bits)
95 40       //  Feature Count(64 field,64 bytes)
91 02       //  Output
c0          //  Application Collection End
```

Step 103, the smart key device returns the descriptor to the upper computer, and Step 104 is executed;

Step 104, the smart key device determines a type of a command when the command sent from the upper computer is received by the smart key device, Step 105 is executed in the case that the command is a protocol command; Step 106 is executed in the case that the command is a functional command;

in Embodiment 2, the command is determined according to the fifth byte of the command, the command is a functional command in the case that the fifth byte is 83H; the command is a protocol command in the case that the fifth byte is 81H or 86H;

Step 105, the smart key device returns corresponding data, and Step 104 is returned to;

in Embodiment 2, the received data is returned in the case that the fifth byte of the command is a first data; data of seventeen valid bytes is returned in the case that the fifth byte of the command is a second data; preferably, the first data is 81H, and the second data is 86H;

Step 106, the smart key device determines a type of the functional command, Step 107 is executed in the case that the functional command is a register-requesting command; Step 114 is executed in the case that the functional command is an identify-requested command; Step 119 is executed in the case that the functional command is an obtaining version number command;

specifically, in Embodiment 2, the smart key device determines the type of the functional command according to a second byte of a data field of the command, the command is the register-requesting command in the case that data (digits) at the second byte of the data field is a first value; the command is the identify-requested command in the case that the data (digits) at the second byte of the data field is a second value; the command is the obtaining version number command in the case that the data (digits) at the second byte of the data field is a third value; preferably, the first value is 01; the second value is 02; and the third value is 03;

in Embodiment 2, the data field of the register-requesting command includes a challenge parameter of 32 bytes and a domicile application parameter of 32 bytes; in which, the challenge parameter is client trust side data; the domicile application parameter is a domicile abstract value which is obtained by performing an abstract calculation on a user registered domain name and registered user information; the data field of the identify-requested command includes the challenge parameter of 32 bytes, the domicile application parameter of 32 bytes, a key handle length of 1 byte, and a key handle; the identify-requested command complies with APDU format, which specifically means:CL IN P1 P2 Lc data field Le, specifically, in Embodiment 2, P1 means a control character, for instance, the smart key device must return identification authentication respond information in the case that a value of P1 is 0x07; the smart key device signs and authenticates the identification and returns respond information in the case that the value of P1 is 0x03;

Step 107, the smart key device generates a user key pair and a corresponding key handle, obtains information of the key according to the generated user key pair and the domicile application parameter in the register-requesting command, and looks up an unoccupied key index, Step 109 is executed in the case that the unoccupied key index is found; Step 108 is executed in the case that the unoccupied key index is not found;

in Embodiment 2, each key index corresponds to a key handle, a domicile application parameter, a user key pair and a counter;

in Embodiment 2, the key handle is configured to inquire a corresponding user key pair outside the smart key device; the key index is configured to inquire a corresponding user key pair inside the smart key device;

Step 108, the smart key device determines whether unoccupied space is large enough, if yes, a corresponding key index is generated, and Step 109 is executed; otherwise, an error is reported, and Step 104 is returned to;

Step 109, the smart key device determines whether user pressing-key information is received in a preset duration, if yes, Step 110 is executed; otherwise, an error is reported, and Step 104 is returned to;

preferably, in Embodiment 2, the preset duration is 5 seconds;

Step 110, the smart key device relates the generated user key pair with the key index and the key handle, and signs on the data field of the register-requesting command according to a preset algorithm so as to obtain a first signature result, and saves the first signature result;

preferably, in Embodiment 2, the user key pair is an ECC key pair whose length is 96 bytes; the preset algorithm is an ECDSA algorithm or a SM2 algorithm;

specifically, in Embodiment 2, the data to be signed, which is signed, includes: a reserved character of 1 byte, which is 0x00 for instance; a respond parameter of 32 bytes; the domicile application parameter of 32 bytes; a key handle of the user key pair and a user public key of 65 bytes;

specifically, in Embodiment 2, the process of signing is that the data field of the register-requesting command is performed on a hash algorithm according to the preset algorithm so as to obtain a first hash value, the first hash value is signed on by using a private key in the user key pair so as to obtain the first signature result;

Step 111, the smart key device issues a digital certificate for the user key pair by using a private key in a preset root key pair;

specifically, the digital certificate in Embodiment 2 includes: the domicile application parameter, such as user information, and user public key;

in Embodiment 2, the process of generating the digital certificate specifically is that the smart key device stores a certificate template inside itself, and then the smart key device generates a certificate serial number, and updates the serial number in the certificate and the user public key in the certificate with the certificate serial number and the user public key, and signs on data, such as the version number and a public key, in the certificate template by using the preset private key inside the smart key device, and puts the signature result into a sign item of the certificate template;

the process of issuing the certificate includes: the smart key device presets a root key pair inside itself, the public key in the root key pair is stored in a sever side, and the smart key device issues a digital certificate for the user key pair by using the private key in the root key pair; the server side can authenticate whether the certificate is legitimate by using the public key in the root key pair so as to realize mutual authentication;

in Embodiment 2, preferably, the digital certificate is X.509 certificate, whose format specifically is:

[Certificate::=SEQUENCE{
tbsCertificate TBSCertificate,    //certificate information, structure as follow
signatureAlgorithm AlgorithmIdentifier, //issuer signature algorithm identifier
signature BIT STRING              // issuer signature
} in which, the structure of a first item TBSCertificate is

TBSCertificate ::=SEQUENCE{
version [0] EXPLICIT Version DEFAULT v1,   //X.509 version number
serialNumber CertificateSerialNumber,      //certificate serial number
signature AlgorithmIdentifier,             //signature algorithm identifier
issuer Name                //issuer name
validity Validity,         //validity of the certificate
subject Name               //information of the subject
subjectPublic smart key device Info SubjectPublic the smart key device Info, //public key of holder of the certificate
extensions [3] EXPLICIT Extension OPTIONAL   //certificate extension item, optional
} an object which is signed on by the certificate in the present Embodiment 2 is content of TBSCertificate; the content of TBSCertificate is signed on by using a private key pre-stored inside the smart key device;

Step 112, the smart key device saves the generated user key pair according to the key index;

in Embodiment 2, a format of saving the user key pair is preset, which specifically is: a key handle of the user key pair of 4 bytes+a domicile application parameter of 32 bytes+the user key pair of 96 bytes+the counter of 4 bytes which is 0 when registered;

in which, the counter is configured to indicate a number of times of authenticating identification by the smart key device, and an initialize value of the counter is 0, once the authentication is successful, the number of the counter plus 1;

Step 113, the smart key device returns register-respond data to the upper computer according to a first preset format, and returns to Step 104;

in Embodiment 2, the register-respond data includes a digital certificate and the first signature result, and the first preset format specifically is:

| reserved character | the user public key | length of the key handle | key handle of user key pair | digital certificate | the first signature result |
|---|---|---|---|---|---|
| 1 byte | 65 bytes | 1 byte | | | |

Step 114, the smart key device determines whether a corresponding key handle is registered according to a length of the key handle in the identify-requested command and the key handle in the identify-requested command, if yes, Step 115 is executed; otherwise, an error is reported, and Step 104 is executed;

in Embodiment 2, Step 114 specifically comprises:

Step 114-1, the smart key device determines whether the length of the key handle in the identify-requested command is same as the length of the saved key handle, if yes, Step 114-2 is executed; otherwise, an error is reported, and Step 104 is returned to;

Step 114-2, the smart key device determines whether the key handle in the identify-requested command is same as the saved key handle, if yes, Step 115 is executed; otherwise, an error is reported, and Step 104 is returned to;

Step 115, the smart key device determines whether the domicile application parameter in the identify-requested command is same as the saved domicile application parameter, if yes, Step 116 is executed; otherwise, an error is reported and Step 104 is returned to;

specifically, in Embodiment 2, the key index, the key handle, the domicile application parameter and the user key pair are saved in one to one correspondence;

Step 116, the smart key device waits for user pressing-key information, and determines whether the user pressing-key information is received in a preset duration, if yes, Step 117 is executed; otherwise, an error is reported, and Step 104 is returned to;

Step 117, the smart key device obtains a corresponding user key pair according to the key handle in the identify-requested command, and signs on the data field of the identify-requested command according to the preset algorithm by using the private key in the user key pair so as to obtain a second signature result;

in Embodiment 2, the data field in Step 117 includes: the domicile application parameter of 32 bytes, a user existence byte of 1 byte, a counter of 4 bytes, and a challenge parameter of 32 bytes;

Step 118, the smart key device returns identify-respond data to the upper computer according to the second preset format, and returns to Step 104;

in Embodiment 2, the second preset format is

| User existence byte | Counter | The second sign |
|---|---|---|
| 1 | 4 | |

Step 119, the smart key device returns a preset character string, and goes back to Step 104;

specifically, the preset character string in Embodiment 2 is U2F_V2.

Embodiment 3

Figure 3:
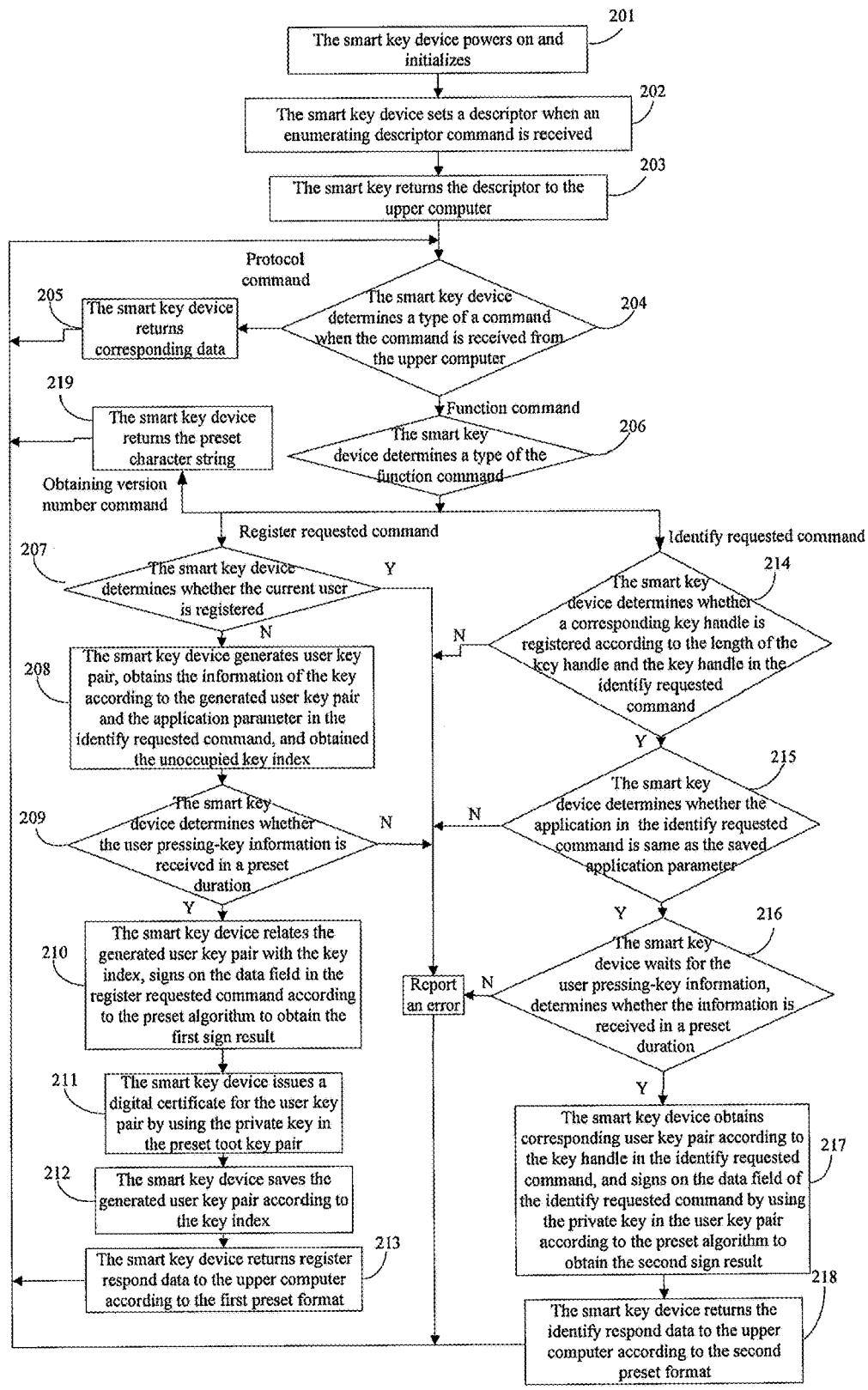
FIG. 3 shows a flow chart of a working method of a smart key device according to Embodiment 3 of the present invention.

It provides a working method of a smart key device according to Embodiment 3 of the present invention, in Embodiment 3, it permits to register once instead of repeat registration for many times, and then identity is authenticated, as shown in FIG. 3, the method comprises:

Step 201, the smart key device is powered on and initialized;

Step 202, the smart key device sets a descriptor when an enumerating descriptor command sent from the upper computer is received by the smart key device;

specifically, in Embodiment 3, that the smart key device sets the descriptor specifically includes:

Step 202-1, a content of a configuration descriptor is set as a HID device;

Step 202-2, a report descriptor is set;

in Embodiment 3, a format of the report descriptor specifically is:

```
Usage Page, //usage page
Usage, //usage
Collection, //application collection
//Input Report structure
Usage (X), Usage (Y), //usage X/Y
Logical Minimum (0), //logical minimum 0
Logical maximum (255), //logical maximum 255
Feature Size (8), // report size is 8bit
Feature Count (64), // report count is 64bit
Input(Data, Variable, Relative), //input usage
//Output Report structure
Usage (X), Usage (Y), // usage X/Y
Logical Minimum (0), //logical minimum 0
Logical Maximum (255), //logical maximum 255
Feature Size (8), // report size is 8bit
Feature Count (64), //report count is 64bit
Input(Data, Variable, Relative). //output usage
End Collection // end application collection
``` that the report descriptor is set specifically includes a global Usage Page is set as 0x d0 f1, a part Usage is set as 0x01, a Usage in Input Report structure is set as 0x20, a Usage in Output Report structure is set as 0x21;

Step 203, the smart key device returns the descriptor to the upper computer, and Step 204 is executed;

Step 204, the smart key device determines a type of a command when the command sent from the upper computer is received by the smart key device, Step 205 is executed in the case that the command is a protocol command; Step 206 is executed in the case that the command is a functional command;

in Embodiment 3, the smart key device determines the type of the command according to the fifth byte of the command, the command is the functional command in the case that the fifth byte is 83H; the command is the protocol command in the case that the fifth byte is 81H or 86H;

Step 205, the smart key device returns corresponding data, and goes back to Step 204;

in Embodiment 3, the received data is returned in the case that the fifth byte of the command is a first data; data of seventeen valid bytes is returned in the case that the fifth byte of the command is a second data; preferably, the first data is 81H, and the second data is 86H;

Step 206, the smart key device determines a type of the functional command, Step 207 is executed in the case that the functional command is a register-requesting command; Step 214 is executed in the case that the functional command is an identify-requested command; Step 219 is executed in the case that the functional command is an obtaining version number command;

specifically, in Embodiment 3, the smart key device determines a type of the functional command according to a second byte of the data field of the command, the functional command is a register-requesting command in the case that data at the second byte of the data field is 01; the functional command is an identify-requested command in the case that data at the second byte of the data field is 02; the functional command is an obtaining version number command in the case that the data at the second byte of the data field is 03;

in Embodiment 3, the data field of the register-requesting command includes a challenge parameter of the 32 bytes and the domicile application parameter of 32 bytes, in which, the challenge parameter is client trust side data; the domicile application parameter is registered user information; the data field of the identify-requested command includes the challenge parameter of 32 bytes, the domicile application parameter of 32 bytes, a length of key handle of 1 byte and a key handle; the identify-requested command complies with APDU format which specifically is CL IN P1 P2 Lc data field Le; in Embodiment 3, P1 indicates a control character, for instance, the smart key device must return identification authentication respond information in the case that the value of P1 is 0x07; the smart key device performs operation of signature and authentication and returns respond information in the case that the value of P1 is 0x03;

Step 207, the smart key device determines whether the current user is registered, if yes, report an error and go back to Step 204; otherwise, go to Step 208;

Step 208, the smart key device generates the user key pair and obtains information of the key according to the generated user key pair and the domicile application parameter in the register-requesting command, and obtains an unoccupied key index;

in Embodiment 3, each key index corresponds to a key handle, a domicile application parameter, a key pair, and a counter;

Step 209, the smart key device determines whether user pressing-key information is received in a preset duration, if yes, Step 210 is executed; otherwise, an error is reported, and Step 204 is returned to;

in Embodiment 3, the preset duration preferably is 5 seconds;

Step 210, the smart key device relates the generated user key pair with the key index, and signs on the data field of the register-requesting command according to the preset algorithm so as to obtain a first signature result and saves the first signature result;

preferably, in Embodiment 3, the user key pair is ECC key pair whose length is 96 bytes; and the preset algorithm is ECDSA algorithm or SM2 algorithm;

specifically, the data to be signed in Embodiment 3 includes: a reserved character of 1 byte (0x00 for instance), a respond parameter of 32 bytes, a domicile application parameter of 32 bytes, a key handle of the user key pair and a user public key of 65 bytes;

specifically, in Embodiment 3, the specific process of signature is that the data field of the register-requesting command is performed on a hash calculation according to the preset algorithm so as to obtain a first hash value, the first hash value is signed on by using a private key in the user key pair so as to obtain the first signature result;

Step 211, the smart key device issues a digital certificate for the user key pair by using a private key in a preset root key pair;

specifically, the digital certificate in Embodiment 3 includes the domicile application parameter, such as user information and user public key;

in Embodiment 3, the process of generating the digital certificate specifically is that the smart key device stores a certificate template inside the smart key device, generates a certificate serial number, updates a serial number and a user public key in the certificate with the certificate serial number and the user public key, signs on the version number and the public key in the certificate template by using the private key stored inside the smart key device, and puts the signature result into a signature item of the certificate template;

the process of issuing a certificate includes: the smart key device presets a root key pair inside itself, in which, the public key in the root key pair is stored in a client side, the private key is used by the smart key device to issue a digital certificate for the user key; and the server side can authenticate legitimate of the certificate by using the public key in the root key pair to realize mutual authentication;

in Embodiment 3, preferably, the digital certificate is X.509 certificate, of which the format is:

```
[Certificate ::= SEQUENCE {
tbsCertificate TBSCertificate,    //information of the certificate,
structure as follow
signatureAlgorithm AlgorithmIdentifier, //issuer signature algorithm
identifier
signature BIT STRING              //issuer signature
}
``` in which, structure of TBSCertificate:

```
TBSCertificate ::= SEQUENCE {
Version [0] EXPLICIT Version DEFAULT v1,    //X.509 version
number
serialNumber CertificateSerialNumber,       //certificate serial number
signature AlgorithmIdentifier,              //signature algorithm identifier
issuer Name,                                //issuer name
validity Validity,                          //certificate validity
subject Name,                               // subject information
subjectPublic the smart key device Info SubjectPublic the smart
key device Info, //certificate holder public key
extensions [3] EXPLICIT Extension OPTIONAL //certificate
extension item, optional
}
``` the subject signed on by the certificate in Embodiment 3 is a content of TBSCertificate; the content of TBSCertificate is signed on by using the private key pre-stored in the smart key device;

Step 212, the smart key device saves the generated user key pair according a key index;

in Embodiment 3, the format of saving the user key pair is preset, which specifically is that a key handle of the user key pair of 4 bytes+a domicile application parameter of 32 bytes+a user key pair of 96 bytes+a counter of 4 bytes whose initial value is 0 when registered;

in which, the counter is configured to indicate number of times of identification authentication by the smart key device, and the initial value of the counter is0, once the identification is authenticated successful for one time, the value of the counter plus 1;

Step 213, the smart key device returns register-respond data to the upper computer according to a first preset format, and goes back to Step 204;

in Embodiment 3, the register-respond data includes the digital certificate and the first signature result, the first preset format specifically is:

| reserved character | user public key | length of key handle | key handle of the user key pair | digital certificate | the first signature result |
|---|---|---|---|---|---|
| 1 byte | 65 bytes | 1 byte | | | |

Step 214, the smart key device determines whether a corresponding key handle is registered according to the length of the key handle and the key handle in the identify-requested command, if yes, Step 215 is executed; otherwise, an error is reported, and Step 204 is returned to;

in Embodiment 3, Step 214 specifically includes:

Step 214-1, the smart key device determines whether the length of the key handle in the identify-requested command is same as the saved length of the key handle, if yes, Step 214-2 is executed; otherwise, an error is reported, and Step 204 is returned to;

Step 214-2, the smart key device determines whether the key handle in the identify-requested command is same as the saved key handle, if yes, Step 215 is executed; otherwise, invalid key information is returned, and Step 204 is returned to;

Step 215, the smart key device determines whether the domicile application parameter in the identify-requested command is same as the saved domicile application parameter, if yes, Step 216 is executed; otherwise, an error is reported and Step 204 is returned to;

specifically, in Embodiment 3, a key index, a key handle, a domicile application parameter and a user key pair are saved in one to one correspondence;

Step 216, the smart key device waits for user pressing-key information, and determines whether the user pressing-key information is received in a preset duration, if yes, Step 217 is executed; otherwise, an error is reported, and Step 204 is returned to;

Step 217, the smart key device obtains a corresponding user key pair according to the key handle in the identify-requested command, and signs on the data field of the identify-requested command by using the private key in the user key pair according to the preset algorithm so as to obtain a second signature result;

in Embodiment 3, the data field in Step 213 includes: a domicile application parameter of 32 bytes, a user existence byte of 1 byte, a counter of 4 bytes and a challenge parameter of 32 bytes;

in Step 218, the smart key device returns identify-respond data to the upper computer according to the second preset format, and returns to Step 204;

in Embodiment 3, the second preset format is

| user existence byte | counter | the second signature result |
|---|---|---|
| 1 | 4 | |

Step 219, the smart key device returns a preset character string, and goes back to Step 204;

Specifically, the preset character string in Embodiment 3 is U2F_V2.

The described embodiments are only preferred embodiments of the application and the embodiments are not intended to limit the application. Any alteration or change easily obtained by those skilled in the art based on the application should fall in the scope of protection of the application.

The invention claimed is:

1. A working method of a smart key device, wherein the working method comprises the following steps:
   S1) powering on, by the smart key device, and initializing;
   S2) setting, by the smart key device, a descriptor and returning the descriptor to an upper computer when an enumerating descriptor command sent from the upper computer is received by the smart key device;
   S3) determining, by the smart key device, a type of a command when the command sent from the upper computer is received by the smart key device, executing Step S4 in the case that the command is a register-requesting command; executing Step S7 in the case that the command is an identify-requested command; and executing a corresponding operation in the case that the command is other type of command, then returning to Step S3;
   S4) determining, by the smart key device, whether any user pressing-key information is received by the smart key device, if yes, executing Step S5; otherwise, prompting an error, then returning to Step S3;
   S5) relating, by the smart key device, a generated user key pair with a correspondingly built key handle, and signing on data field of the register-requesting command according to a preset algorithm so as to obtain a first signature result and saving the first signature result; generating a certificate serial number, issuing a digital certificate corresponding to the certificate serial number for the user key pair by using a private key in a preset root key pair, in which, the data field of the register-requesting command includes a challenge parameter and a registered application parameter;
   S6) saving, by the smart key device, the user key pair and the key handle according to a preset format, and generating register-respond data according to the digital certificate and the first signature result and returning the register-respond data to the upper computer, and returning to Step S3;
   S7) determining, by the smart key device, whether the user is legitimate according to the identify-requested command, if yes, executing Step S8; otherwise, prompting an error, and returning to Step S3;
   S8) waiting, by the smart key device, for user pressing-key information, and determining whether the user pressing-key information is received, if yes, executing Step S9; otherwise, prompting an error, and returning to Step S3;
   S9) obtaining, by the smart key device, a corresponding user key pair according to the key handle in the identify-requested command, and signing on the data field of the identify-requested command by using the private key in the user key pair according to the preset algorithm so as to obtain a second signature result; and
   S10) generating, by the smart key device, identify-respond data according to the second signature result and returning the identify-respond data to the upper computer, and returning to Step S3.

2. The method as claimed in claim 1, wherein, setting, by the smart key device, the descriptor and returning the descriptor to the upper computer comprises the following steps:
   S22-1) setting, by the smart key device, a content of a configuration descriptor as a HID (Human interface device) device;
   S22-2) setting, by the smart key device, a report descriptor; and
   S22-3) returning, by the smart key device, the configuration descriptor and the report descriptor to the upper computer.

3. The method as claimed in claim 1, wherein in Step S3, in the case that the smart key device determines that the type of the command is a protocol command, executing Step A1;
   A1) detecting, by the smart key device, the fifth byte of the command, returning the received data to the upper computer in the case that a digit at the fifth byte is a first data, and returning to Step S3; while returning data of seventeen valid bytes to the upper computer in the case that a digit at the fifth byte is a second data, and returning to Step S3.

4. The method as claimed in claim 1, wherein in Step S3, in the case that the smart key device determines that the command is of a type for obtaining a version number, executing Step B1;
- B1) returning, by the smart key device, a preset character string to the upper computer, and returning to Step S3.

5. The method as claimed in claim 1, wherein between Step S3 and Step S4, the method further comprises the following steps:
- C1) generating, by the smart key device, the user key pair and the key handle, obtaining information of the key according to the user key pair and the domicile application parameter in the register-requesting command, looking up any unoccupied key index, executing Step S4 in the case that the unoccupied key index is found; executing Step C2 in the case that the unoccupied key index is not found;
- C2) determining, by the smart key device, whether unoccupied space is a space of a suitable size, if yes, generating a corresponding key index, and executing Step S4; otherwise, returning information that the unoccupied space is not large enough, and returning to Step S3;
- Step S5 further comprises: relating, by the smart key device, the generated user key pair with the key index;
- Step S6 further comprises: storing, by the smart key device, the user key pair, the key index and the domicile application parameter in the register-requesting command according to the preset format.

6. The method as claimed in claim 1, wherein when no user pressing-key information is received in Step S4, the method further comprises: determining, by the smart key device, whether a waiting time reaches a preset duration, if yes, prompting an error, and returning to Step S3; otherwise, returning to Step S4.

7. The method as claimed in claim 1, wherein signing on the data field of the register-requesting command according to the preset algorithm comprises:
- performing, by the smart key device, a hash algorithm on the data field of the register-requesting command according to the preset algorithm so as to obtain a first hash value, signing on the first hash value by using a private key in the user key pair so as to obtain the first signature result.

8. The method as claimed in claim 1, wherein when the smart key device determines that the user is legitimate in Step S7, the method further comprises the following steps:
- S71) determining, by the smart key device, whether a corresponding key handle is registered according to a key handle and a length of the key handle in the identify-requested command, if yes, executing Step S72; otherwise, prompting an error, and returning to Step S3;
- S72) determining, by the smart key device, whether a domicile application parameter in the identify-requested command is just the same as the saved domicile application parameter, if yes, executing Step S8; otherwise, prompting an error, and returning to Step S3.

9. The method as claimed in claim 8, wherein Step S71 specifically comprises the following steps:
- S71-1) determining, by the smart key device, whether a length of the key handle in the identify-requested command is just the same as the saved the length of the key handle, if yes, executing Step S71-2; otherwise, prompting an error, and returning to Step S3;
- S71-2) determining, by the smart key device, whether a key handle in the identify-requested command is just the same as the saved key handle, if yes, executing Step S72; otherwise, prompting an error, and returning to Step S3.

10. The method as claimed in claim 1, wherein saving, by the smart key device, the user key pair and the key handle according to the preset format comprises: saving, by the smart key device, the user key pair, the key handle and the domicile application parameter in the register-requesting command according to the preset format; and
- between Step S3 and Step S4, the method further comprises the following steps:
- D1) determining, by the smart key device, whether the current user is registered according to the domicile application parameter, if yes, prompting an error, and returning to Step S3; otherwise, executing Step D2;
- D2) generating, by the smart key device, the user key pair, and obtaining the information of the key according to the user key pair and the domicile application parameter in the register-requesting command, and executing Step S4.

11. The method as claimed in claim 10, wherein Step D1 comprises:
- determining, by the smart key device, whether the domicile application parameter is saved, if yes, the current user is registered; otherwise, the current user is not yet registered.

12. The method as claimed in claim 1, wherein
- in Step 8, when the smart key device does not receive the user pressing-key information, the method comprises: determining, by the smart key device, whether the waiting time reaches the preset duration, if yes, prompting an error, and returning to Step S3; otherwise, returning to Step S8.

13. The method as claimed in claim 1, wherein determining the type of the command in Step S3 specifically comprises: determining, by the smart key device, the type of the command according to the second byte of the data field of the command, the command is a register-requesting command in the case that a digit at the second byte of the data field is the first value; while the command is an identify-requested command in the case that a digit at the second byte of the data field is the second value.

* * * * *